(12) United States Patent
Ahmed et al.

(10) Patent No.: US 11,470,137 B2
(45) Date of Patent: Oct. 11, 2022

(54) METHOD AND SYSTEM FOR ENCODING GAME VIDEO AND AUDIO REMOTELY STREAMED TO A REMOTE COMPUTER SYSTEM

(71) Applicant: Rainway, Inc., Seattle, WA (US)

(72) Inventors: Aaron Ahmed, Edinburgh (GB);
Andrew Sampson, Seattle, WA (US);
Evan Banyash, Seattle, WA (US);
Roman Ryltsov, Kharkov (UA)

(73) Assignee: Rainway, Inc., Seattle, WA (US)

( * ) Notice: Subject to any disclaimer, the term of this patent is extended or adjusted under 35 U.S.C. 154(b) by 0 days.

(21) Appl. No.: 16/716,088

(22) Filed: Dec. 16, 2019

(65) Prior Publication Data

US 2020/0220916 A1 Jul. 9, 2020

Related U.S. Application Data

(60) Provisional application No. 62/789,965, filed on Jan. 8, 2019.

(51) Int. Cl.
| | |
|---|---|
| *H04L 65/70* | (2022.01) |
| *H04L 67/025* | (2022.01) |
| *A63F 13/355* | (2014.01) |
| *G06T 1/20* | (2006.01) |

(52) U.S. Cl.
CPC ............ *H04L 65/70* (2022.05); *A63F 13/355* (2014.09); *G06T 1/20* (2013.01); *H04L 67/025* (2013.01); *A63F 2300/538* (2013.01)

(58) Field of Classification Search
CPC .... H04L 65/607; H04L 67/025; A63F 13/355; A63F 2300/538; G06T 1/20

USPC ........................................................ 709/246
See application file for complete search history.

(56) References Cited

U.S. PATENT DOCUMENTS

| | | | |
|---|---|---|---|
| 10,713,577 B1 | 7/2020 | Faruquie et al. | |
| 2002/0083157 A1* | 6/2002 | Sekiguchi ............. | H04L 67/303 709/219 |
| 2007/0162568 A1* | 7/2007 | Gupta ................ | H04N 21/6581 348/E5.002 |
| 2010/0167809 A1* | 7/2010 | Perlman ................ | H04L 65/403 463/43 |
| 2010/0293571 A1* | 11/2010 | Rodriguez ....... | H04N 21/23424 725/32 |
| 2016/0080457 A1* | 3/2016 | Perry ..................... | H04N 19/46 709/219 |
| 2016/0184712 A1 | 6/2016 | Colenbrander | |
| 2017/0164010 A1* | 6/2017 | Zheng .................... | H04N 5/772 |
| 2017/0354878 A1 | 12/2017 | Posin | |

(Continued)

*Primary Examiner* — Mahran Y Abu Roumi
(74) *Attorney, Agent, or Firm* — Fenwick & West LLP

(57) ABSTRACT

A system, method, and computer readable medium for remotely playing a game over a network includes capturing game video data that is generated for a display device of a host computer system running a game. The method also includes capturing game audio data that is generated for an audio output device of the host computer system. Additionally, the method includes encoding the game video data and the game audio data as a multimedia stream. Further, the method includes transmitting the multimedia stream to a remote computer system over a media session. The multimedia stream is displayed on the remote computer system for remote game play by a user.

19 Claims, 6 Drawing Sheets

(56) References Cited

U.S. PATENT DOCUMENTS

| | | |
|---|---|---|
| 2018/0359040 A1 | 12/2018 | Lee et al. |
| 2019/0217191 A1* | 7/2019 | Colenbrander ....... H04L 67/303 |
| 2019/0270020 A1* | 9/2019 | Miura ..................... A63F 13/87 |
| 2020/0139237 A1* | 5/2020 | Butler ................... A63F 13/352 |
| 2020/0206612 A1* | 7/2020 | Gault ................... A63F 13/335 |

* cited by examiner

Header

Structure

| Property | Type | |
|---|---|---|
| PacketId | Uint8 | |
| IsLittleEndian | Boolean | |
| + New | | | count: 2

Packet IDs

| Value | Type | |
|---|---|---|
| 0 | Chunked | |
| 1 | Video | |
| 2 | Audio | |
| + New | | | count: 3

Chunked

| Property | Type | |
|---|---|---|
| Id | Uint32 | |
| Index | Uint8 | |
| LastChunk | Boolean | |
| Payload | Binary | |
| + New | | | count: 4

Bodies

Video

| Property | Type | |
|---|---|---|
| TimeStamp | Float64 | |
| DesktopWidth | Uint16 | |
| DesktopHeight | Uint16 | |
| DesktopX | Int32 | |
| DesktopY | Int32 | |
| Payload | Binary | |
| + New | | |

FIG. 4

METHOD AND SYSTEM FOR ENCODING GAME VIDEO AND AUDIO REMOTELY STREAMED TO A REMOTE COMPUTER SYSTEM

CROSS-REFERENCE TO RELATED APPLICATIONS

This application claims the benefit of U.S. Provisional Patent Application No. 62/789,965, filed Jan. 8, 2019, which is hereby incorporated by reference in its entirety.

FIELD

The present disclosure relates generally to methods and system for remotely network streaming a video game for play on a remote computer system.

BACKGROUND

Presently, video games represent a large segment of software purchased and utilized by consumers. Today's video games are typically complex and require significant amounts of computer and graphics processing power and resources. As such, gamers typically utilize high-end gaming computer systems that include powerful CPUs and multiple graphics cards. These gaming systems, however, are desktop style computer systems that lack mobility. This limits the freedom of gamers to play video games in different settings. Thus, there is a need for a system leverages the power of gaming systems for remote game play.

SUMMARY

In some implementations, a method for encoding video and audio for remotely playing a game over a network includes capturing game video data that is generated for a display device of a host computer system running a game. The method also includes capturing game audio data that is generated for an audio output device of the host computer system. Additionally, the method includes encoding the game video data and the game audio data as a multimedia stream. Further, the method includes transmitting the multimedia stream to a remote computer system over a media session. The multimedia stream is displayed on the remote computer system for remote game play by a user.

Additionally, in some implementations, a computer readable medium storing instructions for causing one or more processors to perform a method for encoding video and audio for remotely playing a game over a network. The method includes capturing game video data that is generated for a display device of a host computer system running a game. The method also includes capturing game audio data that is generated for an audio output device of the host computer system. Additionally, the method includes encoding the game video data and the game audio data as a multimedia stream. Further, the method includes transmitting the multimedia stream to a remote computer system over a media session. The multimedia stream is displayed on the remote computer system for remote game play by a user.

BRIEF DESCRIPTION OF THE DRAWINGS

The present disclosure will become better understood from the detailed description and the drawings, a brief summary of which is provided below.

FIG. 4 illustrates an example of a packet structure for transmitting a multimedia stream, according to various implementations.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some implementations are implemented by a computer system. A computer system can include a processor, a memory, and a non-transitory computer-readable medium. The memory and non-transitory medium can store instructions for performing methods and steps described herein.

Figure 1A:
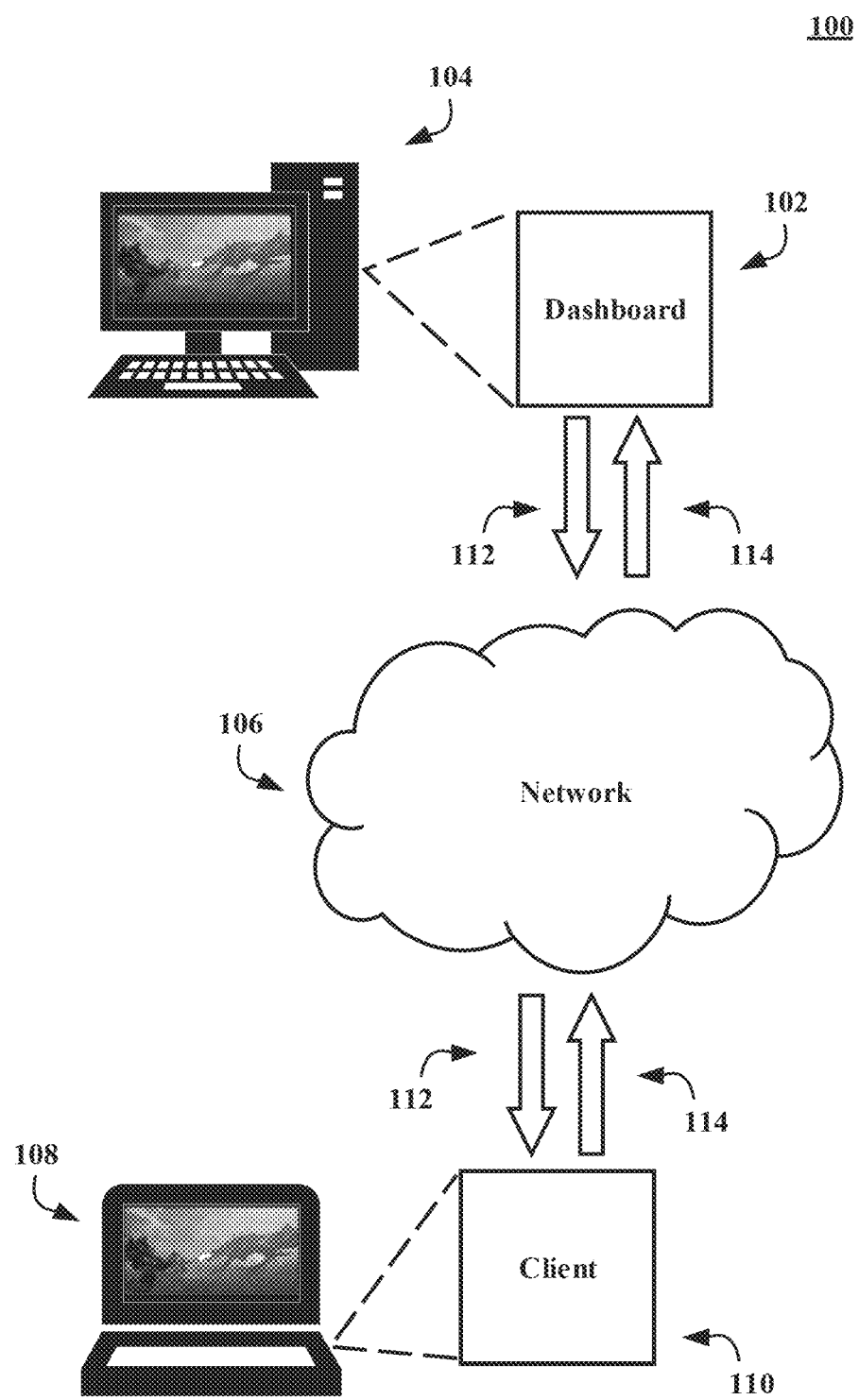
FIG. 1A illustrates a block diagram of an example of a network environment in which game play can be streamed from a host computer system to a remote computer device, according to various implementations.

FIG. 1A is a block diagram illustrating an example of a network environment 100 in which game play can be streamed from a host computer system to a remote computer system, according to various implementations. While FIG. 1A illustrates various components contained in the network environment 100, FIG. 1A illustrates one example of a network environment and additional components can be added and existing components can be removed.

As illustrated in FIG. 1A, a dashboard 102 is installed on a host computer system 104. The dashboard 102 enables remote game play, over a network 106, for games available and running on the host computer system 104. For example, a remote computer system 108 can remotely play a game hosted on the host computer system 104 using a client 110.

In some implementations, the client 110 can be a network browser (e.g., web browser), media browser (e.g., video player), etc.

In implementations, when a user connects to the dashboard 102 with the client 110, the dashboard 102 generates a graphical user interface (GUI) that presents a list of games available to remotely play on the remote computer system 108. To generate the GUI, the dashboard 102 performs a discovery process on the host computer system 104 and identifies games that can be launched on the host computer system 104 and streamed to the remote computer system 108. To identify the games, the dashboard 102 scans storage locations in the host computer system 104 that are typically associated with games. For example, the dashboard 102 can scan a registry, file paths commonly associated with games, databases associated with games, and software libraries (e.g., dynamic linked libraries (DLLs)) associated with games. In some implementations, the dashboard 102 can perform a heuristic search. The games identified by the dashboard 102 include games stored on the host computer system 104 and games available through game streaming services such as Steam, Origin, UPlay and GOG Galaxy.

The GUI generated by the dashboard 102 can include an indication (visual and/or textual) of the games available for remote play and an active link for a user initiate game play. For example, the games can be presented as cards in a grid, with a title related banner as the background of each, as discussed further below. The indication provided in the GUI can be an interactive widget that provides additional information about the game. For example, as a pointing device (e.g., cursor) hovers over one of the game cards, additional information can be presented, for example, the game title, a short description, playtime statistics, a slideshow of screenshots from the game, or a relevant video etc. The GUI, generated by the dashboard 102, can also include menus and links to access other features of the dashboard 102. The other features can include settings and configuration for the dashboard 102, controller settings for input, a game rating feature, a chat feature, etc.

In implementations, once a user selects to play a game, the dashboard 102 launches the game on the host computer system 104. To launch the game, the dashboard 102 can store and utilize launch parameters and access information for the game that are determined during the discovery process, as discussed further below. Once the game begins executing on the host computer system 104, the dashboard 102 captures image data (e.g., image frames) that are transmitted to a display device (e.g., monitor) of the host computer system 104. Likewise, the dashboard 102 captures audio data transmitted to audio devices (e.g., speakers, headphones, etc.) of the host computer system 104. As the image data and audio data is captured, the dashboard 102 generates a game multimedia stream based on the captured image data and audio data.

In implementations, the dashboard 102 generates a remote encoding pipeline and prepares a video feed and an audio feed based on the captured image data and audio data. The dashboard 102 can generate a series of packets for the video feed and audio feed (multimedia stream) for transmission to the remote computer system 108. Once generated, the dashboard 102 transmits the series of packets to the client 110, via the network 106. In some implementations, the video feed and the audio feed can be multiplexed as a multimedia stream. In some implementations, the video feed and the audio feed can be transmitted over separate channels.

In implementations, to receive the data, the remote computer system 108 connects to the dashboard 102 using a media exchange protocol. In some implementations, the client 110 can connect to the dashboard 102 using Web Real-Time Communication (WebRTC) and can exchange data using WebRTC data channels. In some implementations, the client 110 can connect to the dashboard using Web Sockets.

As the packets are received, the client 110 decodes the packets and reconstructs the video feed and audio feed using media codecs. In some implementations, the client 110 can forward the data to the Media Source Extensions Application Programming Interface (MSE API). Once decoded, the client 110 plays the video on a display device (e.g., monitor, device screen, etc.) of the remote computer system 108 and plays the audio on an audio device (e.g., speaker, headphones, etc.) of the remote computer system 108.

In implementations, as the client 110 plays the video and audio stream, the user of the remote computer system 108 inputs movements as if the user was playing the game. The client 110 captures the input device (e.g., keyboard, mouse, game controller, etc.) input from events (e.g., browser events). The client 110 relays the input device input to the dashboard 102, and, in response, the dashboard 102 applies the input device input directly to the game executing on the host computer system 104. In some implementations, if the client is a web browser, game controller input can be captured via the hypertext markup language (HTML) version 5 gamepad API, and, at the remote computer system 108, a virtual controller can used to emulate the inputs on the host computer system 104.

In some implementations, the client 110 and the dashboard 102 can capture and apply mouse input via two modes: absolute and relative. In absolute mode, the client 110 can send the absolute coordinates of every new mouse position as the cursor is moved.

In relative mode, the client 110 can capture the cursor position, hide the cursor from view, and send every mouse movement to the dashboard 102, in relative form. When the cursor is captured, the client 110 can attempt to predict the location of the remote cursor. The prediction can be achieved by adding all the relative movements sent since the cursor was captured to the starting position. Then, the client 110 can draw a relative cursor at the predicted position. The dashboard 102 can send the location of the remote cursor periodically so that the remote cursor position can be periodically corrected to match the client 110 version of the cursor. When the cursor is not visible, such as in controlling a first person shooter game, the cursor can be hidden entirely and no prediction or correction techniques is required.

In implementations, one or more of the components of the dashboard 102 and the client 110 can be implemented as software programs or modules that perform the methods, process, and protocols described herein. The software programs or modules can be written in a variety of programming languages, such as JAVA, C++, C#, Python code, Visual Basic, hypertext markup language (HTML), extensible markup language (XML), and the like to accommodate a variety of operating systems, computing system architectures, etc.

The host computer system 104 can be any type of computer system capable of communicating with and interacting with the dashboard 102, the remote computer system 108, and the client 110, and performing the process and methods described herein. As described herein, the host computer system 104 can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

The remote computer system 108 can be any type of computer system capable of communicating with and interacting with the dashboard 102, the host computer system 104, and the client 110, and performing the process and methods described herein. As described herein, the remote computer system 108 can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

The network 106 can include local area networks (LANs), wide area networks (WANs), telephone networks, such as the Public Switched Telephone Network (PSTN), an intranet, the Internet, or a combination thereof. It should be understood that where the terms server or computer system are used, this includes the use of networked arrangements of multiple devices operating as a server or computer system. For example, distributed or parallel computing can be used.

Figure 1B:
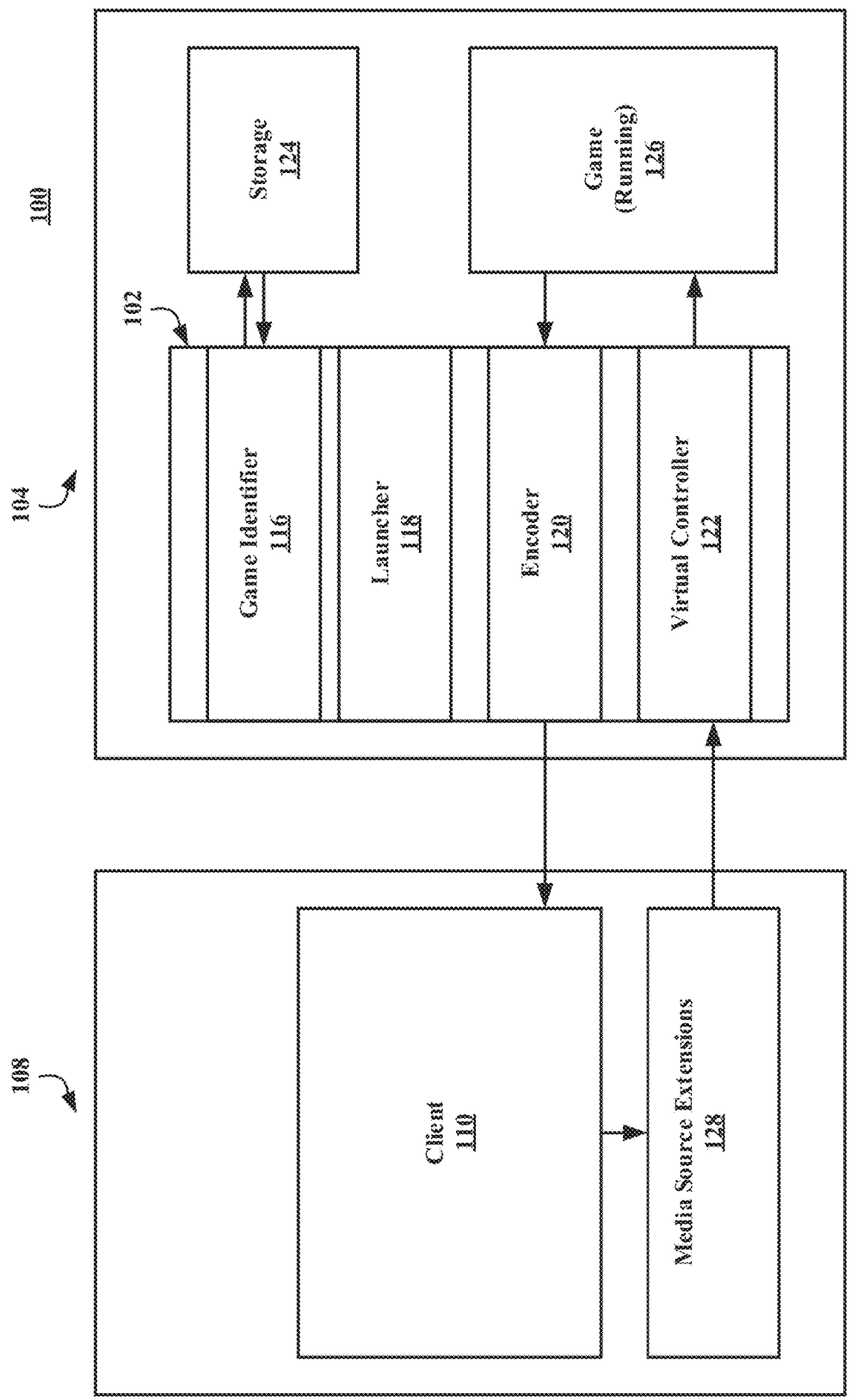
FIG. 1B illustrates a block diagram of an example of a dashboard for facilitating remote streaming of game play from a host computer system to a remote computer device, according to various implementations.

FIG. 1B illustrates an example of the dashboard 102 for facilitating remote streaming of game play from a host computer system to a remote computer device, according to various implementations, according to various implementations. While FIG. 1B illustrates various components contained in the dashboard 102, FIG. 1B illustrates one example of a dashboard and additional components can be added and existing components can be removed.

As illustrated, the dashboard 102 includes a game identifier 116, a launcher 118, and encoder 120, and a virtual controller 122. The dashboard 102 is configured to execute on the host computer system 104 in order to provide remote game play to the remote computer system 108.

The game identifier 116 is configured to identify games that are available for play on the host computer system 104 and remote play on the remote computer system 108. The game identifier is configured to perform a discovery process on the host computer system 104. The discovery process scans the host computer system 104 in order to identify games that can be launched on the host computer system 104 and streamed to the remote computer system 108. To identify the games, the game identifier is configured to scan storage locations in the host computer system 104 that are typically associated with games. For example, the dashboard 102 can scan a registry, file paths commonly associated with games, databases associated with games, and software libraries (e.g., dynamic linked libraries (DLLs)) associated with games, as discussed in U.S. Provisional Application No. 62/789,963, entitled "Method and System for Remotely Streaming a Game Executing on a Host Computer System to a Remote Computer System" to Ahmed et al. and filed on the same day as the instant application, the entire contents of which are incorporated herein by reference.

The launcher 118 is configured to launch a game 126 that has been selected by user at the remote computer system 108. The launcher 118 can be configured to retrieve the launch and access parameters determined by the game identifier 116 and launch the game 126 selected by the user.

The encoder 120 is configured to capture image data and audio data for the game 126 running on the host computer system 104. The encoder 120 is also configured to generate the game multimedia stream from the captured image data and audio data and provide the multimedia stream to the client 110. The encoder 120 include one or more software modules and software libraries to implement the services to capture the image data and audio data and generate the multimedia stream.

For example, the encoder 120 can provide a DesktopCapture service for capturing image data sent to the display device of the host computer system 104. The DesktopCapture service can be built into a desktop capture DLL (e.g., DesktopCapture.dll) and can be consumed as in-process library by the dashboard 102. In some implementations, the desktop capture DLL can be built using Component Object Model (COM) technology and enables easy integration with other software items, including and specifically by means of automatic interoperation with .NET environment. In some implementations, the components of the dashboard 102 (and other applications) can be developed in C#, and the desktop capture DLL can consume generated data using standard lightweight interoperation, with the complexity of interaction with native operating system (OS) APIs, such as Desktop Duplication, Direct3D, Media Foundation, Windows Audio Session, hardware vendor specific software development kits (SDKs), hidden by the desktop capture DLL. In some implementations, the DesktopCapture services can include four services covered by DesktopCapture, Session, Multiplexer classes, respectively and supplementary services. Together the DesktopCapture, Session, Multiplexer classes can cover, end to end, the process of video and audio capture of content of a specific display device (e.g., game video output) and audio device (e.g., game audio output) with the generation of a stream of data compatible with multimedia streaming (e.g., web streaming). The Desktop Capture class can provide enumeration of video and audio inputs, library defined supplementary functionality (e.g., logging management, performance telemetry), and session creation. The session class can provide display device capture session management. The multiplexer class can provide video and audio processing, encoding, and multiplexing services. The supplementary services can include web server integration, reference output generation, Media Foundation primitives.

In some implementations, the Desktop Capture service can manage communication to APIs and software libraries. The APIs and software libraries can include Windows APIs such as Desktop Duplication, Direct3D versions 11, 12, Media Foundation, Windows Audio Session API (WASAPI); third party libraries such as Opus, WebM; and vendor specific SDKs such as NVIDIA Video Codec SDK, AMD Advanced Media Framework (AMF) SDK, Intel Media SDK.

In some implementations, the DesktopCapture class can provide high level services of an API such as detection and enumeration of available capture devices (e.g., monitors, video encoding options, audio input devices, audio output devices to capture in loopback mode). Also, the DesktopCapture class can enumerate video encoding options with additional information on hardware affinity and support for cross-adapter data transfer capabilities. For example, a typical setup of the DesktopCapture class can allow the dashboard 102 to choose a display device of interest where the game 126 is presented, an audio endpoint device typically used for audio output by game 126, respective hardware video encoding option, and then can offer session creation services.

In some implementations, the Session class can implement the requirements of video capture from display device operating to present video content of the game 126, including high activity dynamic content due to interaction with the game 126. The Session class can operate to run video capture as a desktop duplication session with immediate real-time data shaping to meet needs of multimedia streaming over the network 106. Additionally, to convert the video feed to requested fixed rate stream, the Session class can handle intermittent duplication outages, for example, taking place during re-initialization of the underlying devices and hardware. The Session class can manage multiple related technologies in order to generate consistent video feed for the multimedia stream.

In some implementations, the session class can be activated for specific display device (e.g., monitor), and can internally communicate with Windows OS DXGI services to setup Desktop Duplication service and capture video content as by the hardware of the host computer system 104. The Session class can duplicate the video feed and convert it to requested video properties while maintaining minimal processing latency. The Session class can provide video processing such automatically scaling the captured content to a requested resolution, cropping rather than scaling, etc. The Session class can shape the display device updates to produce a fixed frame rate feed as needed for generating the multimedia stream. The Session class can also provide video pointer tracking services such as pointer visibility, position and shape tracking as video is being captured; blending the shape into captured video and/or tracking the pointer shape properties separately to re-create the shape as needed on the remote computer system 108. The Session class also provides video overlay services such as blending diagnostic or otherwise configurable information to video frame as the video frame is being produced.

The Session class can implement a desktop duplication capture loop that continuously pulls display device (e.g., monitor) frames with updates in the form of DirectX Graphics Infrastructure (DXGI/D3D11) textures along with pointer update information. The loop can be tolerant to API failures related to re-initialization of the hardware device and attempts to handle hardware device state changes transparently. Once a video frame is captured, the data is contained in an ephemeral texture where the service takes a copy of data (e.g., copies, scales or crops depending on context) from into a long lasting texture from managed texture loop. The Session class can manage an additional compatible Direct3D 11 device to reduce interference between capture activity and Desktop Duplication API. The Session class can automatically synchronize the captured data between the hardware devices along with data processing. In respective modes of operation, the Session class additional processing steps of blending pointer shape into captured frame and/or textual overlay data. The resulting texture can be exposed as a new frame for produced video feed for the multimedia stream. The Session class can record runtime metrics at certain steps of the processing and can attach diagnostic information to video frame data so that the data could be embedded into resulting multimedia stream.

In some implementations, the Multiplexer class can implement real-time media processing pipeline, which connects to video capture class to consume video stream from Desktop Duplication API. The Multiplexer class can also implement audio capture and, on the downstream end, produces a compressed a multiplexer media stream per requests and configuration of the client 110. The Multiplexer class can build a media pipeline around Media Foundation API, which specifically can define the infrastructure and individual software components and provide supplementary APIs such as Real-Time Working Queue (RTWQ) API and Multimedia Class Scheduler Service (MMCSS). The Multiplexer class, in general, can be designed to remain compatible with Media Foundation API as a foundation, and also maintain the internal implementation components (primitives) compatible with Media Foundation API for the purpose of interoperability and ease of pipeline restructure. The Multiplexer class can eliminate some use of stock OS components that do not provide flexibility for performance reasons. The Multiplexer class can provide data multiplexing services. The multiplexing services can produce chunks of data bitstream in a format defined by the configuration of the service. The format can be network (e.g., web) compatible so that the dashboard 102 route the data with minimal alterations via the network 106 to the client 110 leveraging MSE technology.

The typical setup for the Multiplexer class can define media output such as video and audio real-time streams generated independently without direct synchronization between them. The video stream can be encoded in a H.264 (MPEG-4 Part 10) format and packaged as MP4 (MPEG-4 Part 14) stream structured as fragmented MP4. The video stream generation flexibility can include variable (adaptive) bitrate wherever supported by underlying encoder and options to quickly restart encoding with new format restarting with new MP4 file data. Audio can be encoded with Opus low latency codec packaged as WebM/Matroska stream. Additional audio encoding options can include AAC (MPEG-4 Part 3), MP3, raw Opus, Opus in Ogg container. The Multiplexer class can include additional options to multiplex H.264 video and AAC audio into joint FMP4 stream. Additionally to media stream data, the Multiplexer class issues error and reset notifications responding to events of the data sources.

Even though the Media Foundation primitives are connected together as defined and designed by Media Foundation Media Session API, the Multiplexer class can implement a replacement of Media Session foundation and can implement custom resolution of the topologies in order to provide minimal overhead and fine control over processing steps. The customized implementation of the Multiplexer class also can address a lack of standard capabilities of profiling and registering telemetry data. The internal implementation of Media Session can follow the design of original API and can mimic aspects of topology resolution, events, cooperation with RTWQ API, asynchronous processing model. The Media Session implementation can target real-time processing, support for multiple DXGI device managers, and attaching telemetry information to the data. The Media Session implementation can implement extended capabilities to track telemetry data attached to samples as data flows through the pipeline, and can record its own telemetry data about the topology and state of internal buffers. A Fragmented MP4 (FMP4) sink primitive can be responsible for retrieving collected data and converting the data to embeddable state, so that the telemetry data can be transparently added to the produced output. The Media Session implementation can attach collected data to the payload stream and the performance data can be both recorded with the playable content and retrieved on the client 110, live.

The Multiplexer class can implement both synchronous and asynchronous media foundation transforms. The Media Session implementation can implement an internal synchronous-to-asynchronous adapter to enable use of stock and third party legacy Media Foundation Transforms (MFTs) as asynchronous transforms. The asynchronous transform can convert legacy synchronous Media Foundation Transforms (MFT) to asynchronous primitives. When the dashboard 102 attempts to build a pipeline using an MFT software item which appears to be a synchronous MFT, the dashboard 102 can utilize the asynchronous transform to wrap synchronous transform in question and expose its functionality via newer asynchronous transform interface. In some implementations, the Multiplexer class can implement an internal version of D3D11 Video Processor API wrapper in a dual synchronous/asynchronous MFT form factor standard, and can implement an audio encoder as Opus library wrapper in the form of asynchronous MFT. The Multiplexer class can also perform audio format conversions and resampling in order to fit audio formats and handle an audio resampling MFT that is a synchronous implementation. The synchronous-to-asynchronous transform enables use of full range of MFT primitives shipped with legacy operating system such as the Windows operating systems including those introduced before Windows Vista and those introduced later but designed with legacy interface.

The Multiplexer class can implement an import texture transform that addresses the task of pipeline simulation where video streams and frames originate from hardware other than a graphics processing unit (GPU) subsystem. The production pipelines have video frames coming from GPU subsystem, and the encoder 120 can receive duplicated desktop images hosted by textures in video memory. The import texture transform can offer the functionality of uploading video data into GPU textures and stream the video frames further with delivery of video memory backed data. The import texture transform is capable to address Media Foundation pipelines with multiple GPU and D3D11 device references. Traditional advanced Media Foundation pipelines technically allow use of multiple GPUs, such scenarios require low level interaction with internal primitives to initialize specific D3D11 device. The import texture transform can be used in simulation pipelines traditional to Media Foundation API as well as extend simulation to build multi-GPU pipelines, such as those required to run tests on Direct3D 12 cross device texture transfer transform.

The Multiplexer class can implement a video processor wrapper transform. The video processor wrapper transform can be designed to both analyze operation of standard Video Processing MFT and expand its limitations. The video processor wrapper transform can wrap a standard implementation internally and exposes a similar external interface capable of intercepting communications and respectively updating the data.

In some implementations, the video portion of media processing pipeline provided by the encoder 120 can include video source converting Desktop Duplication API data and output of the Session class described above to Media Foundation pipeline data. The video portion can also include optional cross device texture transfer to utilize secondary GPU processing capabilities. The video portion can also include optional video scaling, shaping of video frames on encoder input to normalize produced encoded output. The video portion can also include video compression services: hardware-assisted with and without use of vendor specific SDKs and fallback software encoder option. The video portion can also include video multiplexing.

In some implementations, the DesktopCapture services can implement a Media Foundation media source primitive which acts as data injection point for Desktop Duplication API captured data and the Session class described above. The primitive can capture generated video frames, typically scaled and with overlays applied as needed, and can ingest the video frames into pipeline for encoding and other data processing.

Figure 2A:
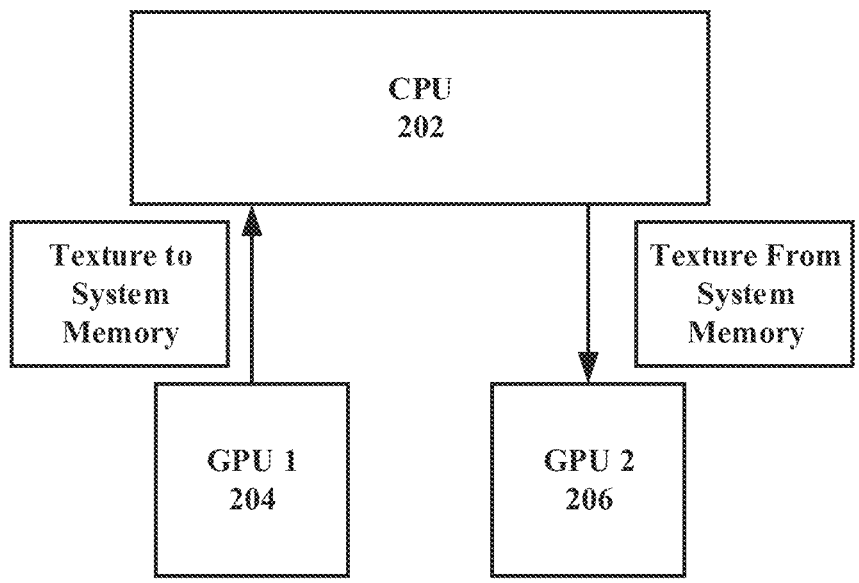
FIGS. 2A and 2B illustrate examples of copying video data between graphics hardware, according to various implementations.

In some implementations, the DesktopCapture services can implement a Media Foundation transform to transfer video frames between GPUs in heterogeneous multi-adapter system (cross device transfer transform). The primitive can extend Media Foundation concept and can implement support for multiple Direct3D adapters and DXGI managers in a Media Foundation topology/pipeline. The cross device transfer transform can implement a texture-to-texture data copy by mapping the textures into CPU addressable space and performing CPU data copy, as illustrated in FIG. 2A. As illustrated in FIG. 2A, textures can be transferred to a CPU 202 from a first GPU 204, and then subsequently transferred to a second GPU 206. The cross device transfer transform can include several code paths to potentially apply more sophisticated and more performance efficient transfers. The cross device transfer transform can utilize SSE and AVX instructions, as well as streaming SIMD instruction set optimized for uncached software write combining (USWC) RAM.

Figure 2B:
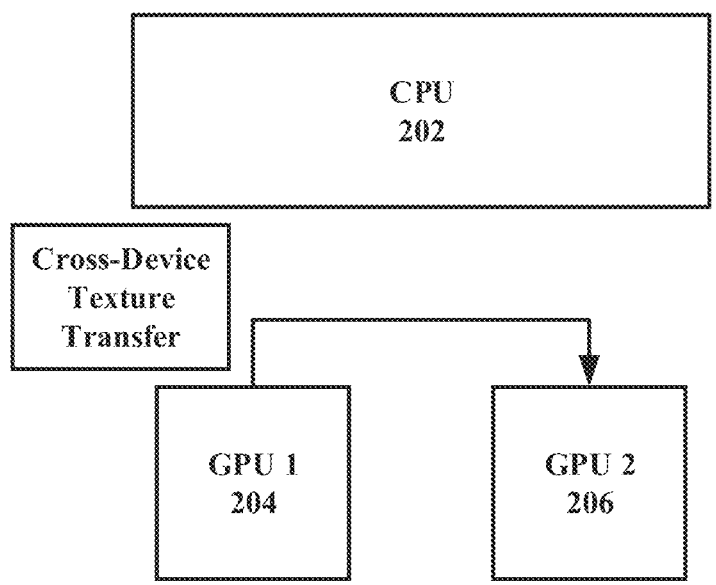

In some implementations, the DesktopCapture services can implement a Media Foundation transform which utilizes Direct3D 12 API to transfer video frames between GPUs in heterogeneous multi-adapter system (Direct3D transfer transform), as illustrated in FIG. 2B. Similarly to cross device transfer transform, the Direct3D transfer transform can implement a transform using two Direct3D devices. The Direct3D transfer transform can implement a texture to texture copy of the data, for example, directly from the first GPU 204 to the second GPU 206, as illustrated in FIG. 2B. The Direct3D transfer transform can internally manage a set of related Direct3D 11 and 12 devices with data taken through the devices. The Direct3D transfer transform can address the tasks of doing GPU-to-GPU transfer eliminating CPU access to data and data copy to system memory, and producing a copy of raw video data in secondary GPU video memory space to enable hardware encoder of secondary GPU to handle video compression. The Direct3D transfer transform can copy data between Direct3D 11 device textures specifically because Desktop Duplication API can be implemented on Direct3D 11 API only, and video encoders both Media Foundation and vendor specific SDK based are offering Direct3D 11 as a GPU binding point. Heterogeneous multi-adapter systems can offer Direct3D 12 functionality, so the transfer implements a multi-step operation to copy the data between GPUs by means of Direct3D 12. This also involves Direct3D 11/12 interoperability, GPU texture and buffer copy operations, and use of GPU copy engine to transfer data between GPUs.

In some implementations, the DesktopCapture services can implement a Media Foundation transform capable of scaling, format conversion, and other processing of media data (video processor transform). The video processor transform can wrap the Direct3D 11 Video Processor API in a similar way to a standard Video Processor MFT. Unlike standard implementations, the video processor transform can offer the ability to blend additional overlay and provides finer control over processor output. Additionally, the video processor transform can add support for asynchronous processing model. The video processor transform can be dual-purposed and participates both as synchronous processor before the data is ingested to Media Foundation pipeline, and can also act as optional asynchronous transform for scaling and/or format conversion as required for tasks of video format fitting.

In some implementations, the DesktopCapture services can implement a Media Foundation transform capable of updating and duplicating video frames thereby addressing video stream shaping for real-time streaming needs (frame rate normalization transform). The frame rate normalization transform can efficiently absorb input frame stream feed gaps and produce output formatted to contain no gaps thereby reducing browser glitches. In case of intermittent shortage of input data, the frame rate normalization transform can duplicate the last good known frame or can insert blackness in order to continue data generation.

In some implementations, the DesktopCapture services can implement a Media Foundation H.264 video encoder transform based on NVIDIA Video Codec SDK (NVIDIA transform) in order to compress video data in efficient way. NVIDIA transform can provide superior encoding services addressing needs of real-time streaming. The NVIDIA transform can provide an encoder that is free from issues related to NVIDIA GPU as secondary adapter (inability to use related encoder, resource leakage) and provide low processing overhead. The NVIDIA transform can provide the ability to apply SDK defined fine tuning and low latency profile. The NVIDIA transform can provide elimination of data copy on encoder input, support for additional input formats (ARGB32 as produced by Desktop Duplication API), and support for real-time target bitrate re-configuration implementing adaptive bitrate streaming.

In some implementations, the DesktopCapture services can implement a Media Foundation H.264 video encoder transform (AMD transform) based on AMD AMF SDK in order to compress video data in efficient way. The AMD transform can provide superior encoding services addressing needs of real-time streaming application that is free from issues related to synchronization of keyed mutex enabled input textures. The AMD transform can provide elimination of data copy on encoder input and the ability to apply SDK defined fine tuning. The AMD transform can provide support for real-time target bitrate re-configuration implementing adaptive bitrate streaming.

In some implementations, the DesktopCapture services can implement a Media Foundation H.264 video encoder transform (INTEL transform) based on Intel Media SDK in order to compress video data in efficient way. The INTEL transform can provide superior encoding services addressing needs of real-time streaming application that is free from issues related to synchronization of keyed mutex enabled input textures. The INTEL transform can provide elimination of data copy on encoder input and the ability to apply SDK defined fine tuning. The INTEL transform can provide support for real-time target bitrate re-configuration implementing adaptive bitrate streaming.

In some implementations, the DesktopCapture services can implement a Media Foundation media sink primitive to produce fragmented MP4 (FMP4) bitstream suitable for real-time streaming (fragmented transform). The fragmented transform can address real-time aspect of streaming and addresses problems where a stock multiplexer appears to be a not a good fit, for example, browser compatibility of FMP4 output data. The fragmented transform can provide packaging of fragments of video/audio data in fractions resulting in low playback latency. The fragmented transform can provide the ability to multiplex H.264 video and AAC audio (experimental) and the ability to restart media stream packaging on video format change starting new FMP4 stream immediately without stream data loss. The fragmented transform can also provide embedding of collected telemetry data into H.264 feed by means of adding H.264 Annex D SEI NAL unit data with user data as defined in "User data unregistered SEI message semantics" section. The data can include of key/value pairs as defined internally by DesktopCapture service.

The Audio portion of media processing pipeline provided by the encoder 120 can include audio capture (e.g., loopback capture media source or alternatively stock Media Foundation, or source for specific WASAPI audio endpoint). The audio portion can include audio format conversion/fitting, audio encoding, and audio multiplexing. The DesktopCapture service can include an option to combine multiple video and audio into combined multi-track stream. The DesktopCapture service can implement a Media Foundation primitive to real-time loopback capture audio data from existing WASAPI endpoint. The primitive can provide minimal overhead capture in data chunks as provided by operating system (esp. 10 milliseconds) and can implement automatic silence insertion in order to produce a continuous stream of data from non-silent audio sequences mixed by WASAPI and provided via loopback capture functionality. The DesktopCapture service can use Opus library wrapper and can implement a Media Foundation audio encoder transform that provides latency, minimal length and latency frames and flexible bitrate as configured by the dashboard 102.

The DesktopCapture service can implement decoding of Opus audio. The audio decoder transform can implement an Opus library decoding functionality that matches production encoder and can be used for internal testing and quality assurance purposes. The decoder enables ability to build encoder-decoder pipelines, including non-live. The DesktopCapture service can use libwebm library to implement a Media Foundation sink primitive in order to format encoded Opus audio stream for web and MSE delivery.

The DesktopCapture service can implement a media sink. The media sink can address the problem of extraction of media data from Media Foundation pipeline in a performance efficient way. The media sink can provide raw data delivery without specific data formatting to handle real-time audio encoding in MP3, raw AAC, and raw Opus formats. The media sink can terminate media processing chains by accepting payload media data and delivering it to byte stream or potentially exposing it via an application defined callback.

In some implementations, the encoder 120 can also provide a cross-process property store to interact with helper interactive processes (e.g., OSD and hotkey responses). The library implements a subsystem that manages cross-platform data storage with a collection of general purpose values with performance efficient access. In some implementations, the library can be standalone external utility that monitors keyboard activity and captures specific hotkeys to convert them to these cross-process property store values.

In some implementations, the encoder 120 can also provide a cross-process storage to share produced bitstreams live. The library can implement an option to duplicate encoded H.264 video stream in a cross-process data storage so that a standalone external application could consume the data in a customized player accessing the live encoded data with minimal overhead.

In some implementations, the encoder 120 can also provide recording static reference output using video primitives (e.g., for testing purposes). The production scenario can be desktop capture, encoding and delivery in network ready format. Development, testing and maintenance tasks can require additional scenarios including ability to compose the internally developed primitives into development friendly pipelines. Reference output class can be a helper subsystem capable to use H.264 encoders to produce deterministic reference video files.

In some implementations, the encoder 120 can also provide a built-in RTP server. The subsystem can implement a tee from output of H.264 encoder that broadcasts video data using RTP UDP in a RFC friendly way and can consume the stream locally or remotely with a crafted configuration for VLC application.

In some implementations, the encoder 120 can also provide a built-in integration with HTTP Server API. The subsystem can duplicate encoded FMP4 output and expose it using HTTP API interface as streamable content consumed in a non-MSE way.

The virtual controller 122 can be configured to capture input device (e.g., mouse, game controller, etc.) inputs at the client 110 and apply the input to the game 126 running on the host computer system 104. The virtual controller can be configured to apply the input via two modes: absolute and relative. For example, in absolute mode, the client 110 can send the absolute coordinates of every new mouse position as the cursor is moved to the virtual controller 122. The virtual controller can be configured to apply the absolute coordinates to the movement in the game 126

In relative mode, for example, the client 110 is configured to capture the cursor position, hide the cursor from view, and send every mouse movement to the dashboard virtual controller, in relative form. When the cursor is captured, the client 110 is configured to predict the location of the remote cursor. The prediction can be achieved by adding all the relative movements sent since the cursor was captured to the starting position. Then, the client 110 is configured to draw a relative cursor at the predicted position. The virtual controller 122 can be configured to send the location of the remote cursor periodically so that the remote cursor position can be periodically corrected to match the client 110 version of the cursor. When the cursor is not visible, such as in controlling a first person shooter game, the cursor can be hidden entirely and no prediction or correction techniques is required.

Figure 3:
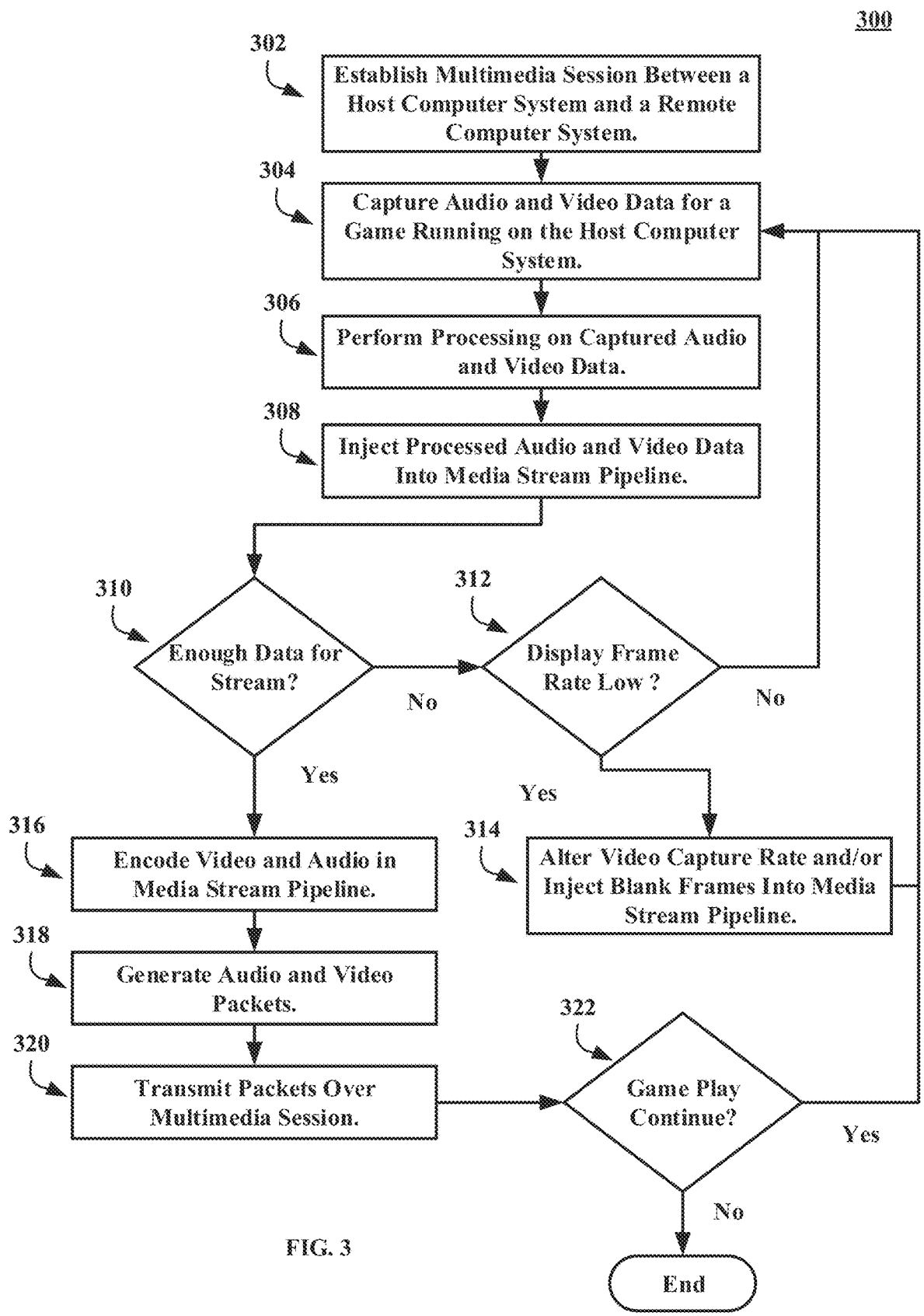
FIG. 3 illustrates an example of a method for encoding video and audio for remote streaming of game play from a host computer system to a remote computer device, according to various implementations.

FIG. 3 illustrates an example of a method 300 for encoding video and audio for remotely playing a game over a network, according to various implementations. While FIG. 3 illustrates various stages that can be performed, stages can be removed and additional stages can be added. Likewise, the order of the illustrated stages can be performed in any order.

In 302, a multimedia session is established between a host computer system and a remote computer system. In implementations, to receive the data, the remote computer system 108 can connect to the dashboard 102 using a media exchange protocol. In some implementations, the client 110 can connect to the dashboard 102 using WebRTC and can exchange data using WebRTC data channels. In some implementations, the client 110 can connect to the dashboard 102 using Web Sockets.

In 304, audio and video data is captured for a game running on the host computer system. In implementations, the dashboard 102 can capture image data (e.g., image frames) that are transmitted to a display device (e.g., monitor) of the host computer system 104. Likewise, the dashboard 102 can capture audio data transmitted to audio devices (e.g., speakers, headphones, etc.) of the host computer system 104.

For example, the Session class, for the encoder 120, can be activated for specific display device (e.g., monitor), and can internally communicate with OS services (e.g., Windows OS DXGI services) to setup Desktop Duplication services and capture video data generated by the hardware of the host computer system 104. The Session class can duplicate the video feed and convert it to requested video properties while maintaining minimal processing latency. Likewise, the Session class, for the encoder 120, can include audio capture (e.g., loopback capture media source or alternatively stock Media Foundation, or source for specific WASAPI audio endpoint).

In 306, processing is performed on the captured audio and video data. In implementations, the dashboard 102 can process and alter the captured video to match the display properties of the remote computer system 108. In implementations, the dashboard 102 can process and alter the captured audio to match the audio properties of the remote computer system 108.

For example, the Session class, of the encoder 120, can duplicate the video data sent to a display device and convert the captured video to requested video properties while maintaining minimal processing latency. The Session class can automatically scale the captured video data to a requested resolution of the client 110, crop the video data for the client 110, etc. Likewise, the Session class can also provide video pointer tracking services such as pointer visibility, position and shape tracking as video is being captured and blending the pointer shape into captured video and/or tracking the pointer shape properties separately to re-create the shape as needed on the remote computer system 108. The Session class also provides video overlay services such as blending diagnostic or otherwise configurable information to video frame as the video frame is being produced.

In 308, the processed audio and video data is injected into a media stream pipeline. In implementations, the dashboard 102 can utilize graphic hardware (e.g., GPU and memory) and/or system hardware (e.g., CPU and system memory) to generate a multimedia stream. In some implementations, a user of the dashboard can select specific graphics hardware and/or system hardware to utilize in the generation of the multimedia stream. In some implementations, the dashboard 102 can automatically select graphics hardware and/or system hardware to utilize in the generation of the multimedia stream.

For example, the Multiplexer class, of the encoder 120, can implement real-time media processing pipeline, which connects to a video capture class to consume video data from Desktop Duplication API, and which connects to the audio capture class to consume audio data. The Multiplexer class can build a media pipeline around Media Foundation API, which specifically can define the infrastructure and individual software components and utilize supplementary APIs such as Real-Time Working Queue (RTWQ) API and Multimedia Class Scheduler Service. The Multiplexer class, in general, can be designed to remain compatible with Media Foundation API as a foundation, and also maintain the internal implementation components (primitives) compatible with Media Foundation API for the purpose of interoperability and ease of pipeline restructure.

Likewise, for example, the Multiplexer class, of the encoder 120, can implement a Media Foundation transform to transfer video frames between GPUs in heterogeneous multi-adapter system (cross device transfer transform). The primitive can extend Media Foundation concept and can implement support for multiple Direct3D adapters and DXGI managers in a Media Foundation topology/pipeline. The cross device transfer transform can implement a texture-to-texture data copy by mapping the textures into CPU addressable space and performing CPU data copy, as illustrated in FIG. 2A. Likewise, the Multiplexer class can implement a Media Foundation transform which utilizes Direct3D 12 API to transfer video frames between GPUs in heterogeneous multi-adapter system (Direct3D transfer transform), as illustrated in FIG. 2B.

In 310, it is determined whether enough data is available to generate a multimedia stream. If not, in 312, it can be determined whether the display frame rate is low compared to the multimedia stream rate. If the frame rate is not low, the method 300 returns to 304 and continues to capture audio and video data and process the audio and video data.

If the display frame rate is low, in 314, the video capture rate is altered and/or blank frames are injected into the media stream pipeline. In implementations, the dashboard 102 can increase the rate at which video data is captured during by the desktop capture in order to increase the video data captured. In implementations, the dashboard 102 can inject blank frames to fill in video data when the rate at which video data is captured is low.

For example, the Session class can shape the display device updates of the desktop duplication to produce a fixed frame rate feed as needed for generating the multimedia stream. Additionally, to convert the video feed to requested fixed rate stream, the Session class can handle intermittent duplication outages, for example, taking place during re-initialization of the underlying devices and hardware by inserting blank frames. The Session class can implement a Media Foundation transform capable of updating and duplicating video frames thereby addressing video stream shaping for real-time streaming needs (frame rate normalization transform). The frame rate normalization transform can efficiently absorb input frame stream feed gaps and produce output formatted to contain no gaps thereby reducing browser glitches. In case of intermittent shortage of input data, the frame rate normalization transform can duplicate the last good known frame or can insert blackness in order to continue data generation. Accordingly, the Session class can manage multiple related technologies in order to generate consistent video feed for the multimedia stream.

In 316, the video and audio in the media steam pipeline is encoded. In implementations, the dashboard 102 can encode video and audio using a known media format. In implementations, the dashboard 102 can encode the video and audio as separate streams.

For example, the Multiplexer class, of the encoder 120, can define media output such as video and audio real-time streams generated independently without direct synchronization between them. The video stream can be encoded in a H.264 (MPEG-4 Part 10) format and packaged as MP4 (MPEG-4 Part 14) stream structured as fragmented MP4. The video stream generation flexibility can include variable (adaptive) bitrate wherever supported by underlying encoder and options to quickly restart encoding with new format restarting with new MP4 file data. Audio can be encoded with Opus low latency codec packaged as WebM/Matroska stream. Additional audio encoding options can include AAC (MPEG-4 Part 3), MP3, raw Opus, Opus in Ogg container. The Multiplexer class can include additional options to multiplex H.264 video and AAC audio into joint FMP4 stream. Additionally to media stream data, the Multiplexer class can issue error and reset notifications responding to events of the data sources. The Multiplexer class can produce a compressed and multiplexed media stream per requests and configuration of the client 110.

For instance, for video, the Multiplexer class can implement a Media Foundation H.264 video encoder transform based on NVIDIA Video Codec SDK (NVIDIA transform) in order to compress video data in efficient way. NVIDIA transform can provide superior encoding services addressing needs of real-time streaming. Likewise, for example, the Multiplexer class can implement a Media Foundation H.264 video encoder transform (AMD transform) based on AMD AMF SDK in order to compress video data in efficient way. The AMD transform can provide superior encoding services addressing needs of real-time streaming application that is free from issues related to synchronization of keyed mutex enabled input textures. Likewise, for example, the Multiplexer class can implement a Media Foundation H.264 video encoder transform (INTEL transform) based on Intel Media SDK in order to compress video data in efficient way. The INTEL transform can provide superior encoding services addressing needs of real-time streaming application that is free from issues related to synchronization of keyed mutex enabled input textures. Additionally, for instance, the Multiplexer class can implement a Media Foundation media sink primitive to produce fragmented MP4 (FMP4) bitstream suitable for real-time streaming (fragmented transform). The fragmented transform can address real-time aspect of streaming and addresses problems where a stock multiplexer appears to be a not a good fit, for example, browser compatibility of FMP4 output data.

For audio, for instance, the Multiplexer class can include audio capture (e.g., loopback capture media source or alternatively stock Media Foundation, or source for specific WASAPI audio endpoint). The Multiplexer class can include an option to combine multiple video and audio into combined multi-track stream. Additionally, the Multiplexer call can use Opus library wrapper and can implement a Media Foundation audio encoder transform that provides latency, minimal length and latency frames and flexible bitrate. Additionally, the Multiplexer class can implement a media sink. The media sink can provide raw data delivery without specific data formatting to handle real-time audio encoding in MP3, raw AAC, and raw Opus formats. The media sink can terminate media processing chains by accepting payload media data and delivering it to byte stream or potentially exposing it via an application defined callback.

In 318, audio and video packets are generated for the encoded video and audio data. In implementations, the dashboard 102 can generate audio and video packets that are compatible with WebRTC and WebRTC data channels. In implementations, the dashboard 102 can generate audio and video packets that are compatible with WebSockets. For example, the dashboard 102 can generate packets using a boring protocol. FIG. 4 illustrates an example of a structure of a video packet generating using the boring protocol.

In 320, the packets are transmitted to the remote computer system over the multimedia session. As the packets are received, the client 110 can decode the packets and can reconstruct the video feed and audio feed using a media codex. In some implementations, the client 110 can forward the data to the MSE API. Once decoded, the client 110 can play the video on a display device (e.g., monitor, device screen, etc.) of the remote computer system 108 and can play the audio on an audio device (e.g., speaker, headphones, etc.) of the remote computer system 108.

In 322, it is determined whether game play continues. If game play is over, the method 300 can end. If game play continues, the method 300 can return to 304 and continue to capture and processes audio and video data for generation of the multimedia stream.

For example, the Session class, of the encoder 120, can implement a desktop duplication capture loop that continuously pulls display device (e.g., monitor) frames with updates in the form of DirectX Graphics Infrastructure (DXGI/D3D11) textures along with pointer update information. The loop can be tolerant to API failures related to re-initialization of the hardware device and attempts to handle hardware device state changes transparently. Once a video frame is captured, the data can be contained in an ephemeral texture where the service takes a copy of data (e.g., copies, scales or crops depending on context) from into a long lasting texture from managed texture loop. The Session class can manage an additional compatible Direct3D 11 device to reduce interference between capture activity and Desktop Duplication API. Likewise, the Session class, for the encoder 120, can implement a loopback capture media source or alternatively stock Media Foundation, or source for specific WASAPI audio endpoint.

Figure 5:
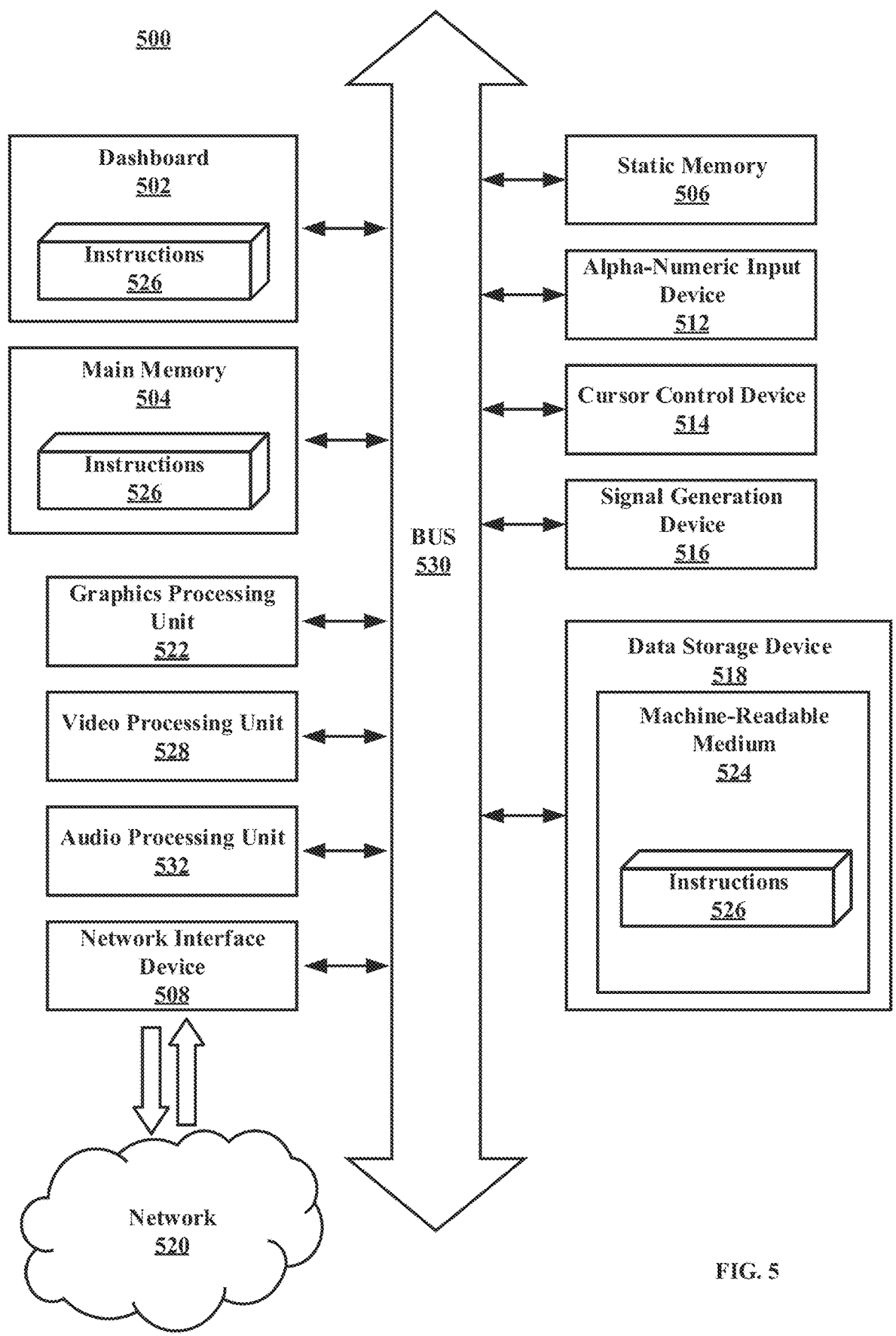
FIG. 5 illustrates an example of a computer system, according to various implementations.

FIG. 5 illustrates an example machine of a computer system within which a set of instructions, for causing the machine to perform any one or more of the methodologies discussed herein, can be executed. In implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" also includes any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. For example, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 further includes a network interface device 508 to communicate over the network 520. The computer system 500 also includes a video display unit 510 (e.g., a liquid crystal display (LCD) or a cathode ray tube (CRT)), an alphanumeric input device 512 (e.g., a keyboard), a cursor control device 515 (e.g., a mouse), a graphics processing unit 522, a signal generation device 516 (e.g., a speaker), graphics processing unit 522, video processing unit 528, and audio processing unit 532.

The data storage device 518 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media.

In implementations, the instructions 526 include instructions to implement functionality corresponding to the components of a device to perform the disclosure herein. While the machine-readable storage medium 524 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" also includes, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The present disclosure also relates to an apparatus for performing the operations herein. This apparatus can be specially constructed for the intended purposes, or it may comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, flash memory devices, or any type of media suitable for storing electronic instructions, each coupled to a computer system bus. Examples of implementations of the present disclosure can also be provided as a computer program product, or software, that may include a machine-readable medium having stored thereon instructions, which can be used to program a computer system (or other electronic devices) to perform a process according to the present disclosure.

Various general purpose systems can be used with programs in accordance with the teachings herein, or a more specialized apparatus can be utilized to perform the method. Examples of the structure for a variety of systems appear in the description above. In addition, the present disclosure is not described with reference to any particular programming language. It will be appreciated that a variety of programming languages may be used to implement the teachings of the disclosure as described herein.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other implementations are within the scope of the following claims.

What is claimed is:

1. A method for encoding video and audio for remotely playing a game over a network, the method comprising:
    sending video data to a first display device of a host computer system executing an instance of a game;
    sending audio data to a first audio output device of the host computer system;
    capturing the video data sent to the first display device, wherein capturing the video data comprises:
        pulling a video frame being displayed on the first display device;
        maintaining selected data from the video frame in an ephemeral texture; and
        generating a copy of the selected data;
    capturing the audio data sent to the first audio output device;
    encoding the video data and the audio data as a multimedia stream;
    determining that a display frame rate of the video data is lower than a streaming rate of the multimedia stream;
    responsive to the display frame rate of the video data being lower than the streaming rate of the multimedia stream, injecting one or more blank frames into the multimedia stream, wherein the one or more blank frames fill in video data;
    transmitting the multimedia stream to a remote computer system over a media session, wherein the video data is retrieved from the multimedia stream and displayed on a second display device of the remote computer system and the audio data is retrieved from the multimedia stream and displayed on a second audio output device the second display device being different from the first display device, the second audio output device being different from the first audio output device;
    receiving, from the remote computer system, data indicating user input that occurred at the remote computer system during display of the video data at the remote computer system, the data indicating the user input comprising information related to input movement events generated by a computer mouse in communication with the remote computer system;
    after receiving the data indicating the user input, applying the user input into the instance of the game executed by the host computer system to control the instance of the game, applying the user input into the instance of the game executed by the host computer system comprising applying the input movement events directly to the game currently executing on the host computer system;
    determining, by the remote computer system, a first position of an indicator;
    detecting, by the remote computer system, a movement of the computer mouse;
    representing, by the remote computer system, a motion of the indicator in a relative form indicating a second position of the indicator relative to the first position, based on the movement of the computer mouse; and
    displaying, by the remote computer system, the indicator at the second position.

2. The method of claim 1, the method further comprising: processing the video data to match display properties of the remote computer system.

3. The method of claim 2, wherein processing the video data comprises one or more of: scaling the video data to match the display properties or cropping the video data to match the display properties.

4. The method of claim 1, the method further comprising: processing the video data to insert a cursor associated with game play.

5. The method of claim 4, the method further comprising: predicting a location of the cursor based on input from the user of the remote computer system during the game play, wherein the cursor is inserted based on the location.

6. The method of claim 1, the method further comprising:
    determining that a rate at which the video data is captured does not match a streaming rate of the multimedia stream; and
    in response, increasing the rate at which the video data is captured.

7. The method of claim 1, the method further comprising:
    injecting the video data into a video encoding pipeline; and
    injecting the audio data into an audio encoding pipeline;
    wherein injecting the video data into the video encoding pipeline comprises:
    directly copying the video data from first graphics hardware that is generating the video data to second graphics hardware.

8. The method of claim 1, the method further comprising:
generating one or more packets for the multimedia stream, wherein the one or more packets are transmitted to the remote computer system.

9. The method of claim 1, the method further comprising:
determining that the media session is experiencing transmission delays; and
in response, changing an encoding rate for encoding the video data and the audio data.

10. The method of claim 1, wherein the user input is responsive to display of the multimedia stream at the remote computer system, and the method further comprises:
receiving one or more video frames captured at the remote computer system, the one or more video frames associated with an ephemeral graphics texture.

11. The method of claim 1, wherein the multimedia stream includes video and audio data from a single source.

12. A non-transitory computer readable medium storing instructions for causing one or more processors to perform a method for encoding video and audio for remotely playing a game over a network, the method comprising:
sending video data to a first display device of a host computer system executing an instance of a game;
sending audio data to a first audio output device of the host computer system;
capturing the video data sent to the first display device, wherein capturing the video data comprises:
pulling a video frame being displayed on the first display device;
maintaining selected data from the video frame in an ephemeral texture; and
generating a copy of the selected data;
capturing the audio data sent to the first audio output device;
encoding the video data and the audio data as a multimedia stream;
determining that a display frame rate of the video data is lower than a streaming rate of the multimedia stream;
responsive to the display frame rate of the video data being lower than the streaming rate of the multimedia stream, injecting one or more blank frames into the multimedia stream wherein the one or more blank frames fill in video data;
transmitting the multimedia stream to a remote computer system over a media session, wherein the video data is retrieved from the multimedia stream and displayed on a second display device of the remote computer system and the audio data is retrieved from the multimedia stream and displayed on a second audio output device the second display device being different from the first display device, the second audio output device being different from the first audio output device;
receiving, from the remote computer system, data indicating user input that occurred at the remote computer system during display of the video data at the remote computer system, the data indicating the user input comprising information related to input movement events generated by a computer mouse in communication with the remote computer system;
after receiving the data indicating the user input, applying the user input into the instance of the game executed by the host computer system to control the instance of the game, applying the user input into the instance of the game executed by the host computer system comprising applying the input movement events directly to the game currently executing on the host computer system;
determining, by the remote computer system, a first position of an indicator;
detecting, by the remote computer system, a movement of the computer mouse;
representing, by the remote computer system, a motion of the indicator in a relative form indicating a second position of the indicator relative to the first position, based on the movement of the computer mouse; and
displaying, by the remote computer system, the indicator at the second position.

13. The non-transitory computer readable medium of claim 12, the method further comprising:
processing the video data to match display properties of the remote computer system, wherein processing the video comprises one or more of: scaling the video data to match the display properties or cropping the video data to match the display properties.

14. The non-transitory computer readable medium of claim 12, the method further comprising:
processing the video data to insert a cursor associated with game play; and
predicting a location of the cursor based on input from the user of the remote computer system during the game play, wherein the cursor is inserted based on the location.

15. The non-transitory computer readable medium of claim 12, the method further comprising:
determining that a rate at which the video data is captured does not match a streaming rate of the multimedia stream; and
in response, increasing the rate at which the game video data is captured.

16. The non-transitory computer readable medium of claim 12, the method further comprising:
injecting the video data into a video encoding pipeline; and
injecting the audio data into an audio encoding pipeline;
wherein injecting the video data into the video encoding pipeline comprises:
directly copying the video data from first graphics hardware that is generating the video data to second graphics hardware.

17. The non-transitory computer readable medium of claim 12, the method further comprising:
generating one or more packets for the multimedia stream, wherein the one or more packets are transmitted to the remote computer system.

18. The non-transitory computer readable medium of claim 12, the method further comprising:
determining that the media session is experiencing transmission delays; and
in response, changing an encoding rate for encoding the video data and the audio data.

19. The non-transitory computer readable medium of claim 12, wherein the multimedia stream includes video and audio data from a single source.

* * * * *